United States Patent [19]

Konrad

[11] 3,968,414

[45] July 6, 1976

[54] BYPASS CONTACTOR CONTROL

[75] Inventor: Charles Edward Konrad, Roanoke, Va.

[73] Assignee: General Electric Company, New York, N.Y.

[22] Filed: June 19, 1974

[21] Appl. No.: 480,717

[52] U.S. Cl. .............................. 318/341; 318/139
[51] Int. Cl.² ......................................... H02P 1/00
[58] Field of Search ........................... 318/391, 139

[56] References Cited
UNITED STATES PATENTS

| | | | |
|---|---|---|---|
| 3,349,309 | 10/1967 | Dannttell | 318/139 X |
| 3,500,161 | 3/1970 | Domann et al. | 318/139 UX |
| 3,517,290 | 6/1970 | Gunsser | 318/139 UX |
| 3,764,810 | 10/1973 | Morton et al. | 318/139 |
| 3,818,291 | 6/1974 | Miyake | 318/139 |
| 3,826,959 | 7/1974 | Anderson | 318/139 |

Primary Examiner—B. Dobeck
Attorney, Agent, or Firm—Walter C. Bernkopf; James H. Beusse

[57] ABSTRACT

A system for operating a bypass contactor in a time-ratio DC to DC control vehicle drive system. In order that the contactor be energized, it is necessary that the voltage across the motor exceed some minimum value, and that directional contactors be closed. A manual bypass switch and a speed control monitoring portion of the system are arranged in a logical OR configuration so that a third condition is fulfilled when either a mark-space ratio of the motor control system exceeds a predetermined value, or a fixed period of time elapses after manual closure of a bypass demand switch.

In a further embodiment, operation of the bypass system is inhibited upon the sensing of either an undesirably low battery voltage or an inordinately large motor current.

13 Claims, 1 Drawing Figure

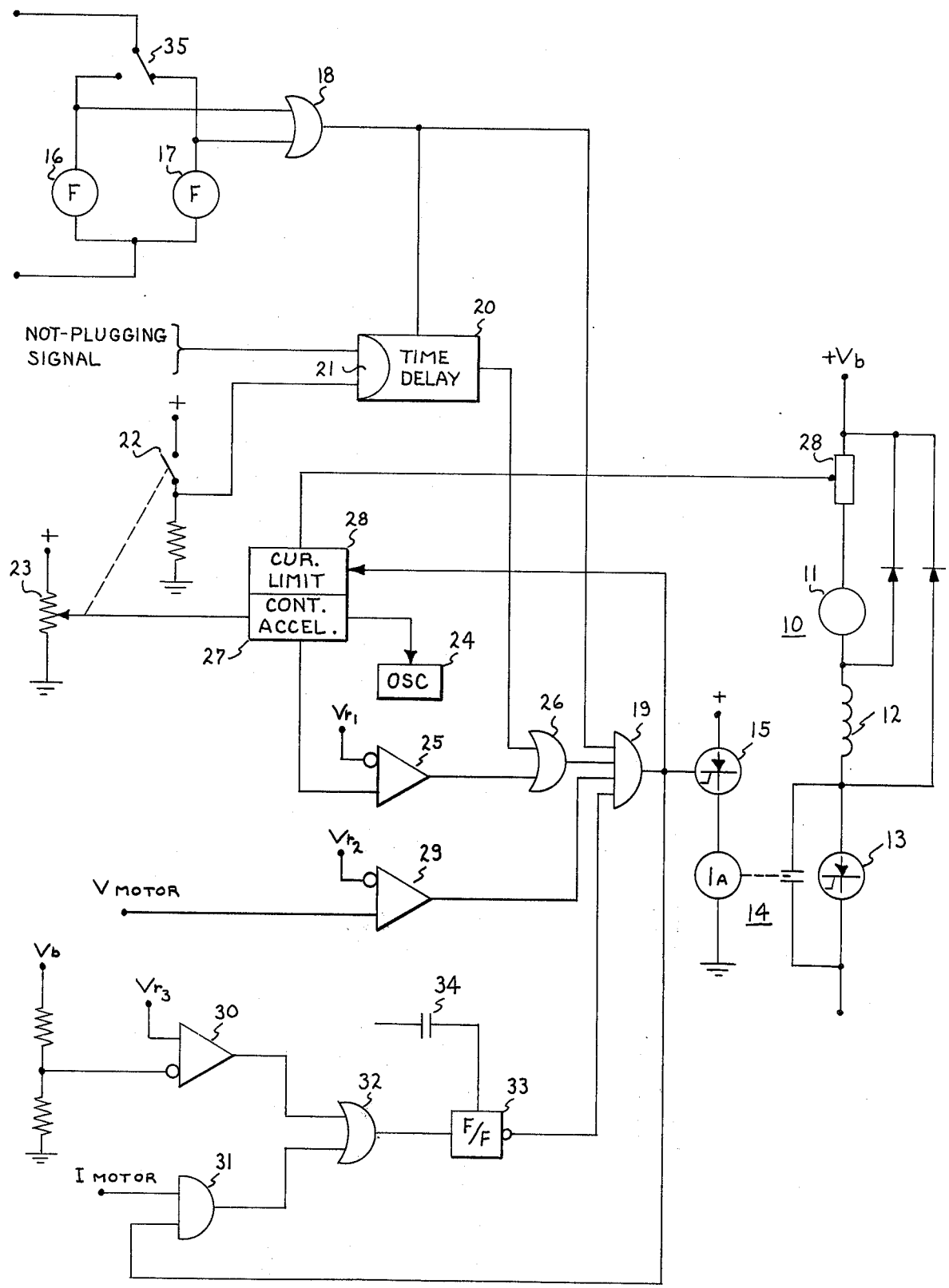

BYPASS CONTACTOR CONTROL

BACKGROUND OF THE INVENTION

The present invention deals with DC to DC time ratio or "chopper" control systems and, more particularly, with means for effecting the operation of a switch bypassing the repetitively-actuated switching means of the time ratio controller.

Control of the operation of modern-day battery-powered vehicles is commonly achieved through the use of time ratio controllers, sometimes referred to as chopper systems. In such a system, electronic switching means are interposed between the traction motor and a source of DC voltage. The switching means are operated at an extremely high rate, the ratio of conductive to non-conductive time (also known as the mark-space ratio) determining the percent of available voltage to be applied across the motor. Early in the development of time ratio controllers it was recognized that, due to the resistive drop therethrough and the heating effected thereby, the use of such electronic switching means is inefficient as the mark-space ratios approach 100%. For this reason, it has been found practical to provide a mechanical switch, termed a bypass contactor, in shunt about the electronic switching means.

Typically the referred-to-arrangement takes the form of a thyristor such as an SCR which is operated by a variable oscillator for affording pulse control of a traction motor. A pair of electro-magnetically-operated contacts in the form of a standard circuit contactor are connected across the SCR and the winding for closing the contacts is coupled in a circuit with a switch which is operated in response to certain circuit parameters.

In one straightforward application the bypass contactor is operated simply by coupling a "kickdown switch," or bypass demand switch, to the vehicle speed control mechanism. In this manner, when the speed control is adjusted for maximum power the bypass contactor is automatically actuated. However, should the vehicle be operating at low speed and the bypass contactor closed before full torque has been developed by the motor, a severe jerk in operation of the vehicle will occur. Aside from being detrimental to the drive train components, a sudden lurch of the vehicle could be dangerous to the driver or to bystanders. To overcome the foregoing problem, it has become customary to insert a time delay mechanism between the demand switch and the contactor actuation means. It is then assumed that after the time delay times out the vehicle will be in a proper state for accepting closure of the bypass contactor, and thus full source voltage, across the traction motor. Other difficulties inhere in this approach, however. For instance, the bypass contactor cannot be closed until the speed control is at its utmost position, regardless of other motor control system parameters. Further, the contactor may be inadvertently closed before the field winding directional contactors are operated, causing the vehicle to suddenly lurch ahead at full power upon energization of the field into the circuit. While various compensating systems have been built, they commonly have had the disadvantage of not allowing the bypass contactor to close until a substantial amount of current is already flowing in the system. In instances where the main SCR's become overheated, it is common to cut back the amount of allowable current. This tends to accentuate the heating problem, however, since the lessened current flow may make it impossible to close the bypass contactor and thus provide a cooling respite for the SCR.

It will therefore be seen that it would be desirable to provide a system which effects the closure of a bypass contactor under all practicable conditions, while normally assuring a smooth transition in torque applied to the drive system. It is therefore an object of the present invention to provide improved means for effecting the operation of a bypass contactor in a traction motor pulse control system.

It is another object of the present invention to provide means for closing a bypass contactor, which assures a smooth transition in generated torque.

SUMMARY OF THE INVENTION

Briefly stated, in accordance with one aspect of the invention the foregoing objects are achieved by providing bypass contactor control means operable only in response to certain combinations of enabling signals. The necessary signals indicate the closure of either forward or reverse directional contactors, the attainment of voltage across a traction motor of some predetermined minimum value and either the achievement by the control of some predetermined minimum mark-space ratio, or the expiration of a predetermined period of time subsequent to the closing of a bypass demand switch.

In a further embodiment, the bypass actuating means are disabled in the presence of a source voltage below a predetermined minimum or an inordinately large motor current in the presence of a high mark-space conductivity ratio.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which the single FIGURE depicts, in schematic form, a bypass contactor control system constructed in accordance with the teachings of the present invention.

DESCRIPTION OF THE PREFERRED EMBODIMENT

The FIGURE discloses a bypass contactor actuation system in conjunction with a traction motor 10 comprising an armature 11 and a field winding 12. While the motor depicted is of the series-connected type it will be understood that the present invention is adaptable for use with shunt and compound motors. While it is customary to provide contactors for selectively connecting the field in a forward or reverse direction in order to control the direction of rotation of the motor, these connections have been deleted from the FIGURE for the sake of simplicity.

Coupled in series with the motor is an electronic switching means 13, shown herein as an SCR. The SCR is rendered conductive by the application to the gate terminal thereof of electrical pulses. The energization and commutation of the SCR serves to determine the average percentage of conduction time, referred to herein as the mark-space ratio. When energized the SCR serves to couple motor 10 across a source of battery voltage $V_b$, the mark-space conductivity ratio determining the percentage of available source voltage which is impressed across the motor.

It has been found inefficient to operate the electronic switching means of a pulse control system at mark-space ratios approaching unity. In order to eliminate the voltage drop arising across the SCR and to prevent inordinate heating thereof during full power applications, a bypass contactor 14 is commonly provided in shunt with the electronic switching means. The energizing winding of the bypass contactor is coupled across a source of energizing potential in series with the switching means 15, herein shown as another SCR. Thus, by applying pulses to the gate of SCR 15 at appropriate times main SCR 13 may be relieved of its load, allowing the cooling thereof and application of the maximum available voltage directly across motor 10.

In order to achieve optimum use of the bypass contactor under all possible circumstances, the present invention contemplates an arrangement which monitors a number of traction system variables and operates the bypass contactor upon the confluence of certain predetermined combinations of these variables. Forward and Reverse contactor windings 16 and 17 are coupled to OR gate 18, the output of which is applied to a master AND gate 19. A time delay circuit 20 and associated AND gate 21, which may conveniently be viewed as a single entity, receives both a not-plugging signal and a signal indicating the manual closure of a bypass demand switch and in consequence thereof outputs an enabling signal to AND gate 19. The bypass demand switch 22 is conveniently coupled to a movable portion of speed control potentiometer 23 in a manner well known to those skilled in the art. The DC voltage appearing at the wiper of potentiometer 23 is applied to a controlled acceleration circuit 27 which in turn controls an oscillator 24 whose output determines the mark-space ratio of main SCR 13. The voltage applied to the oscillator may be taken to be directly proportional to the mark-space ratio of the SCR. This voltage is also applied to a comparator 25, the non-inverting terminal of the comparator having a reference voltage applied thereto such that the output voltage of the comparator changes from one discrete level to another when the mark-space ratio signal has exceeded some predetermined threshold value. Another OR gate 26 receives the signals outputted by time delay 20 and by comparator 25 and produces an output signal in response to either one.

As it will be recognized by those familiar with the electric vehicle control art, it is necessary to provide a current limiting mechanism. To this end, a current limit function 28 is included in the controlled acceleration system of the FIGURE. A current limit system of the type contemplated for use herein is disclosed in detail in a U.S. patent application entitled "Current Limit System For DC Motor Control," Ser. No. 428,022 by C. E. Konrad, filed Dec. 26, 1973 and assigned to the assignee of the present invention. The current limit device, which may simply comprise a transistor whose threshold of conductivity is varied, limits the output of controlled acceleration circuit 27 to prevent oscillator 24 from effecting an increased mark-space ratio when motor current achieves an undesirably high value. A second input to the current limit system 28 derived from the output of AND gate 19, serves to raise the maximum allowable current during the periods when bypass contactor 14 is actuated. This is due to the fact that the bypass contactor is capable of carrying substantially heavier currents than an SCR, without being damaged or overheating. Prior systems in which an invariant maximum current was provided did thus not make optimum use of the bypass contactor and unnecessarily restricted vehicle operation.

A comparator 29 has one input thereof coupled to a reference voltage level $Vr_2$, and the other to a point representing the voltage existing across motor 10. When motor voltage exceeds some predetermined minimum value $Vr_2$ comparator 29 produces an output signal which is transmitted to an input of AND gate 19. Still another comparator 30 receives a voltage representative of battery voltage and, when the departure thereof from a reference voltage $Vr_2$ indicates an undesirable diminution of battery potential, comparator 30 produces an output signal. AND gate 31 then receives a signal indicative of motor current which is in excess of some maximum or "threshold" value, along with the output of AND gate 19. The output signals of AND gate 31 and comparator 30 are transmitted to OR gate 32. OR gate 32 then operates in response to either of the foregoing signals to apply a signal to inverting flip-flop 33. Contacts 34 are operated in concert with a starting switch (not shown) and acts to reset flip-flop 33 for reasons to be described hereinafter.

The operation of the subject circuit will now be described in detail with reference to the above-enumerated elements. When it is initially desired to operate the vehicle a main switch is closed, ordinarily by means of a key lock mechanism. In this manner battery power is applied to the system, including the circuit constituted by motor 10 and SCR 13. A subordinate switch 34 is closed and resets flip-flop 33 such that for normal operating conditions a high or logical "1" output signal is applied to one input of a master AND gate 19. In order to operate the vehicle, field 12 must be connected in the appropriate direction for either forward or reverse motion. To this end, selector switch 35 is closed to apply power to one of the energizing windings 16 or 17 for the forward or reverse contactors, respectively. With the direction of motor torque selected the slider or potentiometer 33 is operated, commonly by means of a foot pedal or hand lever, to apply a signal to oscillator 24 for increasing the mark-space ratio of SCR 13, and thus the average voltage applied across motor 10.

A controlled acceleration stage 27 is interposed between potentiometer 23 and oscillator 24 and serves to prevent the mark-space ratio from increasing too rapidly. The controlled acceleration stage also provides a convenient means with which to place a limitation on the mark-space ratio and therefore motor current. The latter function termed "current limit," is commonly incorporated into traction vehicle control systems to prevent injury to elements of the system.

In order to impress all of the available potential across motor 10, it is necessary to close bypass contactor 14. This may be done to achieve maximum speed or to allow maximum current to flow, producing the most torque possible for climbing steep ramps, climbing over curbs or other obstacles, etc. It is desirable that the bypass contactor shunt main SCR 13 as often as possible, in order to relieve the SCR of its current-carrying duties and to allow it to cool.

It may be assumed that when the speed control is in its extreme position, the operator desires the maximum available torque and/or speed. For this reason the mechanical bypass demand switch 22 is commonly coupled to the wiper of potentiometer 23 so that it is closed when the wiper reaches its extreme "on" position.

Since this might also occur during the "plugging" or reverse-torque braking of the vehicle it is necessary to inhibit the operation of the bypass contactor system during plugging to prevent an unduly high flow of current due to the reversal of the motor connections. For this reason a signal indicative of the absence of plugging, which may be derived from a plugging circuit, of the type shown in U.S. Pat. No. 3,344,328-Morris, is applied along with a signal from the bypass demand switch 22 to a time delay unit 20. Since both signals are necessary to operate the time delay the unit may be conceived of as incorporating an AND function 21, although it may equivalently be considered that the presence of a plugging signal serves to inhibit time delay 20. In addition a signal from OR gate 18, indicating that either F or R contactors have been closed, is necessary to reset the time delay and allow it to operate. Some predetermined period of time after the closure of the demand switch time delay 20 then produces a signal for operating the bypass contactor.

The use of a demand switch together with a time delay for operating the contactor is well-known to those skilled in the art. Although this approach has the advantage of simplicity, it will be recognized that the assumption that the vehicle will have achieved full-voltage operation after an arbitrary period of time has elapsed is often incorrect. For this reason, other criteria are established by the present circuit.

Comparator 29 transmits an enabling signal to AND gate 19 when the voltage across the traction motor has exceeded some minimum reference level. While it is possible to deduce motor voltage from the mark-space ratio of the switch, or equivalently from the signal controlling the operation of oscillator 24 such a method is susceptible if error should, for instance, SCR 15 have failed or should other circuit elements have created an open circuit condition in the power circuit. By limiting the minimum voltage which must exist across the motor the system also limits the maximum voltage differential or jump which occurs across the motor when the bypass contactor is closed. This in turn limits the torque differential applied to the vehicle drive train.

Thus, it is desired to operate the bypass contactor when it has been established a) that the F or R directional contactors are closed; b) that the bypass demand switch is closed, and the system is not plugging; and c) the motor is not in a "stall" condition. The confluence of the three aforementioned factors may then actuate AND gate 19, which in turn operates SCR 15 to allow current to flow through the energizing winding of the bypass contactor.

In order to achieve still further flexibility and to allow the bypass contactor to close at all possible times, the present system is designed to monitor still other system parameters. A threshold circuit, herein shown as comparator 25, monitors the voltage applied to oscillator 24 and thus the mark-space ratio of main SCR 13. When the mark-space ratio has exceeded some predetermined value corresponding to a relatively high voltage impressed across the terminals of motor 10 an enabling signal is applied by comparator 25 to OR gate 26. In this manner, the bypass contactor may be closed despite the fact that the speed control mechanism has not been physically advanced sufficiently to close the bypass demand switch 22. SCR 13 may then be bypassed, for instance, under high-speed running conditions despite the fact that speed control is not adjusted to its extreme condition.

In many applications, it is highly desirable that still other factors be addressed by a bypass contactor control. When battery potential is low, the insufficient voltage is unavailable to cause the contactors to close with enough force to prevent contact chatter and bounce occasioned by vibration or bumping of the vehicle. This intermittent opening of the tips causes arcing and burning which can severly damage the contact surfaces. For this reason, one embodiment of the present system contemplates the monitoring of battery undervoltage by means of comparator 30. The comparator produces a signal when battery voltage $V_b$ declines beneath some predetermined level. In addition, it is desirable that the system be prevented from applying full power across the motor under low speed conditions, resulting in undesirably high current and therefore potentially damaging torque. In order to limit the maximum current and thus the torque produced by the system, motor current is monitored by a threshold device whose output is applied to one terminal of AND gate 31. At the same time, the other terminal of the AND gate receives a signal indicative of the energization of the bypass contactor. Thus, with the bypass contactor closed when current reaches some maximum value AND gate 31 produces a signal utilized for disabling the contactor.

Signals indicating either overcurrent or undervoltage are passed by OR gate 32 to an inverting flip-flop 33. The signal normally produced by the flip-flop and applied to AND gate 19 enables the AND gate so that the bypass contactor may be operated at the requisite times. However, with overcurrent or undervoltage conditions the inverting flip-flop ceases to produce a signal, thus inhibiting AND gate 19 from operating. Since it is conceivable that a sudden surge of current, or a transient dip in battery voltage, might occur when the vehicle is first started a reset terminal of flip-flop 33 is coupled through start switch 34 such that the flip-flop is reset each time the vehicle is re-started.

It will now be seen that the present invention comprises a bypass contactor control system which monitors various factors of battery vehicle operation, optimizing the use of the bypass contactor in that it is closed whenever possible to allow cooling of the main SCR. At the same time, the system assures that full battery voltage will not suddenly be applied across a motor across which a low voltage has been present, causing a drastic discontinuous increase in the amount of torque outputted by the motor. It will be evident from the forgoing description in that certain aspects of the invention are not limited to the particular details of the example illustrated, and it is therefore contemplated that other modifications or applications will occur to those skilled in the art. It is accordingly intended that the appended claims shall cover all such modifications and applications as do not depart from the true spirit and scope of the invention.

I claim:

1. A bypass switch actuating system for an electric vehicle time ratio control having electronic switching means for varying the average voltage impressed across a traction motor in response to signals from a speed control means, directional switch means for determining the direction of torque produced by the motor, plugging sensor means for indicating the presence of plugging activity and bypass switch means for electrically bypassing said electronic switching means, comprising:

means for sensing the state of the directional switching means and outputting a first signal in response thereto;

switch means coupled to the speed control means;

time delay means coupled to said plugging sensor and said switch means and operable to produce a second signal a predetermined period of time after the closing of said switch means, in the absence of plugging activity;

means coupled to the speed control for outputting a third signal when the mark-space ratio of the electronic switching means exceeds a predetermined value;

circuit means for producing a fourth signal in response to either said second or said third signal;

voltage sensing means for outputting a fifth signal when the voltage across the load exceeds a predetermined value; and means for energizing the bypass switch in response to the presence of said first, fourth and fifth signals.

2. The invention defined in claim 1, further including circuit means coupling said means for sensing the state of the directional switching means to said time delay for resetting said time delay in response to the closure of the directional switching means.

3. The invention defined in claim 2, wherein said means for energizing the bypass switch comprise semiconductor switching means coupling a portion of the switch to a point of energizing potential, and a coincidence circuit for enabling said semiconductor switching means upon receipt of said first, fourth and fifth signals.

4. A system for controlling the operation of an electromechanical contactor coupled about the main electronic switching means of a DC chopper circuit adapted to variably control the voltage applied to a DC motor coupling;

means for producing a first signal upon the achievement by the electronic switching means of a predetermined mark-space ratio;

means for producing a second signal upon the achievement of the voltage across the motor of a predetermined value; and means for effecting the closure of the electromechanical contactor in response to the production of said first and said second signals.

5. In an electric vehicle drive system including a traction motor including a winding having directional switches coupled thereto, a time ratio controller having an electronic switching means shunted by a bypass contactor, a speed control for operating the time ratio controller and a bypass demand switch coupled to the speed control, means for operating the bypass contactor comprising:

sensing means coupled to the directional switches for producing a signal representative of the status thereof;

comparator means coupled to the speed control for producing a signal when the mark-space ratio of said electronic switching means exceeds a predetermined value;

time delay means for producing a signal a predetermined period of time after the closure of the bypass demand switch;

voltage responsive means for outputting a signal when the average voltage across said traction motor exceeds a predetermined value; and coincidence means for energizing said bypass contactor upon the reception of signals from said sensing means, said comparator means, and either said speed control or said time delay means.

6. The invention defined in claim 4, further including an acceleration control coupling said speed control to said comparator means for regulating the rate of change of a speed control signal.

7. The invention defined in claim 5, further including current limit means operative to restrict the value of the speed control signal outputted by said acceleration control when motor current attains a predetermined value.

8. The invention defined in claim 7, further including circuit means coupled to said current limit means for causing said speed control signal to be restricted when motor current attains a first, lower value when the bypass contactor is open and a second, higher value when the contactor is closed.

9. A system for operating an electromechanical bypass contactor shunting the electronic switching means of a time ratio control in an electric vehicle drive system, and drive system including a traction motor and directional switching means therefor, means for sensing plugging of the motor, a speed controller for operating the time ratio control and a bypass demand switch coupled to the speed controller, comprising:

directional sensing means for producing a first enabling signal in response to the closure of the directional switching means;

time delay means coupled to the plugging sensing means and to the bypass demand switch for outputting a delayed signal in response to the operation of the bypass demand switch, in the absence of plugging;

first comparator means coupled to the speed control for outputting a signal when the signal produced by the speed control attains a predetermined value;

first gating means coupled to said time delay means and said first comparator means for producing a second enabling signal in the presence of either said delayed signal or said speed signal;

second comparator means adapted to be coupled to the time ratio control for producing a third enabling signal when voltage across the traction motor exceeds some predetermined value;

third comparator means adapted to be coupled to a source of motive power for the traction motor for outputting a source voltage signal when the potential of the source of motive power declines below a predetermined value;

first coincidence means coupled to the time ratio control and to the traction motor for producing an overcurrent signal when the bypass contactor is closed, and motor current exceeds a predetermined value;

second gating means coupled to said third comparator means and said first coincidence means for producing a pilot enabling signal in the presence of either said source voltage signal or said overcurrent signal;

switching means coupled to said second gating means for producing a fourth enabling signal in response to said pilot enabling signal; and second coincidence means operative in the presence of said first, second, third and fourth enabling signals to effect closure of the bypass contactor.

10. The invention defined in claim 9, further including circuit means coupling said directional sensing means to said time delay means to resetting the time delay after each closure of the directional switching means.

11. The invention defined in claim 9, further including controlled acceleration means coupling the speed control to said first comparator means.

12. The invention defined in claim 11, further including current limit means for restricting the signal outputted by said controlled acceleration means when motor current attains a first, lower value when the bypass contactor is open or a second, higher value when the bypass contactor is closed.

13. The invention defined in claim 9, further including means for resetting said switching means each time that the time ratio control system is energized.

* * * * *